(12) United States Patent
Timmons et al.

(10) Patent No.: US 11,961,376 B2
(45) Date of Patent: Apr. 16, 2024

(54) METHOD AND APPARATUS FOR MONEY ITEM PROCESSING

(71) Applicant: CRANE PAYMENT INNOVATIONS LIMITED, Lancashire (GB)

(72) Inventors: Shane Anthony Timmons, Lancashire (GB); Michael Patrick Healy, Lancashire (GB); Kevin Mulvey, Lancashire (GB)

(73) Assignee: Crane Payment Innovations Limited, Lancashire (GB)

( * ) Notice: Subject to any disclaimer, the term of this patent is extended or adjusted under 35 U.S.C. 154(b) by 292 days.

(21) Appl. No.: 17/459,830

(22) Filed: Aug. 27, 2021

(65) Prior Publication Data

US 2021/0390834 A1 Dec. 16, 2021

Related U.S. Application Data

(63) Continuation of application No. 16/466,231, filed as application No. PCT/GB2017/053487 on Nov. 21, 2017, now Pat. No. 11,107,333.

(30) Foreign Application Priority Data

Dec. 1, 2016 (GB) ..................................... 1620384

(51) Int. Cl.
*G07G 1/06* (2006.01)
*G06V 20/62* (2022.01)
(Continued)

(52) U.S. Cl.
CPC .............. *G07G 1/06* (2013.01); *G06V 30/416* (2022.01); *G07D 1/06* (2013.01); *G07D 11/60* (2019.01);
(Continued)

(58) Field of Classification Search
CPC .......... G07G 1/06; G07G 1/0009; G07G 1/12; G06V 30/416; G06V 20/62; G06V 10/22;
(Continued)

(56) References Cited

U.S. PATENT DOCUMENTS 4,124,109 A 11/1978 Bissell et al.
4,650,977 A * 3/1987 Couch ..................... G07F 19/20
235/379
(Continued)

FOREIGN PATENT DOCUMENTS

AU 2009206183 A1 * 2/2010 ............... G06K 9/00
CA 3040520 C * 3/2022 ............. G07F 17/32
(Continued)

OTHER PUBLICATIONS

Brief Communication dated Jan. 27, 2023, in connection with European Application No. 17804276.8, 19 pages.
(Continued)

*Primary Examiner* — Mahendra R Patel

(57) ABSTRACT

Described herein is a method comprising performing optical character recognition on at least one region of a display screen to determine at least one displayed character; identifying, from the determined at least one displayed character, a monetary value to be dispensed; and in response to identifying the monetary value to be dispensed, causing to be dispensed at least one money item corresponding to the identified monetary value. Further described is a method comprising determining, using at least one money item denominating apparatus, a monetary value of at least one received money item; in response to determining the monetary value, automatically providing at least one simulated user input to the interactive user interface indicative of the determined monetary value.

18 Claims, 8 Drawing Sheets

(51) Int. Cl.
   *G06V 30/416*   (2022.01)
   *G07D 1/06*   (2006.01)
   *G07D 11/60*   (2019.01)
   *G07G 1/00*   (2006.01)

(52) U.S. Cl.
   CPC ............ *G07G 1/0009* (2013.01); *G06V 20/62* (2022.01); *G07D 2201/00* (2013.01); *G07D 2211/00* (2013.01)

(58) Field of Classification Search
   CPC ...... G06V 2201/02; G07D 1/06; G07D 11/60; G07D 2201/00; G07D 2211/00; G07D 11/00; G07D 13/00
   USPC .......................................................... 382/100
   See application file for complete search history.

(56) References Cited

U.S. PATENT DOCUMENTS

| | | | | |
|---|---|---|---|---|
| 6,145,738 | A * | 11/2000 | Stinson | G07C 9/253 235/382 |
| 6,318,536 | B1 | 11/2001 | Korman et al. | |
| 6,669,086 | B2 * | 12/2003 | Abdi | G07F 19/20 235/382 |
| 7,513,419 | B1 * | 4/2009 | Crews | G06Q 20/042 235/379 |
| 7,669,757 | B1 * | 3/2010 | Crews | G06Q 20/20 705/16 |
| 8,453,924 | B1 * | 6/2013 | Turocy | G06Q 40/02 235/379 |
| 8,463,430 | B2 * | 6/2013 | Segal | G07F 9/02 700/242 |
| 8,763,897 | B1 * | 7/2014 | Enright | G07D 7/06 235/379 |
| 8,929,640 | B1 * | 1/2015 | Mennie | G06Q 10/00 382/137 |
| 9,224,273 | B1 * | 12/2015 | Atkinson | G07F 19/201 |
| 10,762,750 | B2 | 9/2020 | Gervais et al. | |
| 2002/0029259 | A1 * | 3/2002 | Okada | G06F 3/1454 709/219 |
| 2004/0016797 | A1 * | 1/2004 | Jones | G07F 7/04 235/379 |
| 2004/0226962 | A1 | 11/2004 | Mazursky et al. | |
| 2004/0230535 | A1 | 11/2004 | Binder et al. | |
| 2006/0016884 | A1 * | 1/2006 | Block | G07G 1/0045 235/379 |
| 2006/0066591 | A1 * | 3/2006 | Marggraff | G06F 3/03545 382/187 |
| 2006/0261149 | A1 | 11/2006 | Raghavendra Tulluri | |
| 2007/0235520 | A1 * | 10/2007 | Smith | G06Q 20/40 235/379 |
| 2007/0235523 | A1 * | 10/2007 | Clements | G06Q 20/06 235/379 |
| 2007/0276537 | A1 | 11/2007 | Walker et al. | |
| 2011/0071668 | A1 | 3/2011 | Lin et al. | |
| 2014/0046842 | A1 * | 2/2014 | Irudayam | G06Q 20/32 235/379 |
| 2014/0192210 | A1 * | 7/2014 | Gervautz | G06T 7/74 348/207.1 |
| 2015/0178692 | A1 * | 6/2015 | Nishida | G07D 7/12 705/45 |
| 2015/0235193 | A1 * | 8/2015 | Cummings | G07C 9/27 705/21 |
| 2016/0012465 | A1 * | 1/2016 | Sharp | G06Q 20/321 705/14.17 |
| 2016/0371717 | A1 * | 12/2016 | Black | G06Q 30/0233 |

FOREIGN PATENT DOCUMENTS

| | | | | |
|---|---|---|---|---|
| CN | 102542685 | A | | 7/2012 |
| CN | 105678302 | A | * | 6/2016 |
| CN | 105678302 | A | | 6/2016 |
| EP | 1269448 | A1 | | 1/2003 |
| EP | 2400453 | A1 | * | 12/2011 ............. G06Q 20/00 |
| EP | 2897109 | A1 | * | 7/2015 ......... G07D 11/0087 |
| JP | 2015170045 | A | | 9/2015 |
| WO | 2001069571 | A1 | | 9/2001 |
| WO | 2007117674 | A2 | | 10/2007 |

OTHER PUBLICATIONS

International Search Report and Written Opinion of the International Searching Authority dated Jan. 23, 2018, in connection with International Application No. PCT/GB2017/053487, 19 pages.
Search Report under Section 17 dated May 19, 2017, in connection with United Kingdom Application No. GB1620384.6, 2 pages.
Examination report No. 1 for standard patent application dated Feb. 29, 2020, in connection with Australian Application No. 2017369833 4 pages.
Communication pursuant to Article 94(3) EPC dated Dec. 18, 2020, in connection with European Application No. 17804276.8, 10 pages.
Examination Report under Section 18(3) dated Sep. 30, 2021, in connection with United Kingdom Application No. GB1620384.6, 5 pages.
Examination report dated Apr. 1, 2022, in connection with Australian Application No. 2021201318, 3 pages.

* cited by examiner

METHOD AND APPARATUS FOR MONEY ITEM PROCESSING

CROSS-REFERENCE TO RELATED APPLICATIONS

This application is a continuation of U.S. 371 application Ser. No. 16/466,231, filed on Jun. 3, 2019, which claim priority to International Application No. PCT/GB2017/053487 filed on Nov. 21, 2017, and to British Patent Application No. 1620384.6 filed on Dec. 1, 2016, the disclosures of which are herein incorporated by reference in their entirety.

FIELD

This specification relates to facilitating automatic money item dispensing in a money item processing apparatus. The specification also relates to automatic money item input operations in a money item processing apparatus and controlling the operation of a money item receiving apparatus. Particularly, but not exclusively, the specification relates to methods and apparatuses for automatically dispensing and accepting money items based on information displayed on a display and further to making automated inputs of monetary information for display on a display by simulated user input.

BACKGROUND

Point-of-sale (POS) terminals, such as those used in retail locations and restaurants, generally include a user interface through which an operator of the POS terminal can enter information into the terminal. In many POS terminals, the user interface is displayed on a display screen of the terminal. For example, the terminal may include a touch-screen interface which allows an operator of the terminal to enter information by touch-input. Alternatively, the terminal may include a display screen and another input device, such as a physical keypad or a mouse, via which the operator can enter information to appear on the display screen. The information entered by the operator often includes 'payment-received' amounts, so that the terminal may calculate an amount of change for the operator to dispense to a customer. POS terminals generally include native operating software which facilitates such operations in the terminal.

SUMMARY

This specification provides a method comprising: performing optical character recognition on at least one region of a display screen to determine at least one displayed character; identifying, from the determined at least one displayed character, a monetary value to be dispensed; and in response to identifying the monetary value to be dispensed, causing to be dispensed at least one money item corresponding to the identified monetary value.

Identifying the monetary value to be dispensed may comprise identifying at least one displayed text character representative of the monetary value to be dispensed.

The at least one region of the display screen may comprise a pre-selected sub region of the display screen.

The at least one region of the display screen may be defined by a substantially transparent virtual window.

The method may comprise detecting a trigger event and performing the optical character recognition in response to the detected trigger event.

The trigger event may be an event indicative of a display of the monetary value in the at least one region of the display screen.

Detecting the trigger event may comprise detecting a user input.

Detecting the trigger event may comprise automatically detecting a change in the appearance of visible content in the display screen.

The method may comprise detecting the change in the appearance of visible content in the at least one further region of the display screen.

The method may comprise detecting the change in the appearance of visible content in at least one further region of the display screen.

The at least one further region of the display screen may be defined by a substantially transparent virtual window.

Automatically detecting the change in the appearance of visible content in the display screen may comprise capturing a plurality of screenshots of at least a part of the display screen and comparing the plurality of screenshots to identify one or more changes in visible content.

The method may comprise capturing a first of the plurality of screenshots at a first time and capturing a second of the plurality of screenshots at a later time.

The change in the appearance of visible content in the display screen may comprise a change in a displayed colour.

The change in the appearance of visible content in the display screen may comprise a display of at least one text character.

The at least one text character may be displayed in the at least one region of the di splay screen.

The at least one text character may correspond to the monetary value to be dispensed.

The change in the appearance of visible content in the display screen may comprise replacement of at least one initial text character with the at least one text character.

The at least one initial text character may correspond to a zero monetary value.

The method may comprise: determining, using at least one money item denominating apparatus, a monetary value of at least one received money item; in response to determining the monetary value, automatically causing at least one simulated user input indicative of the determined monetary value to be provided to an interactive user interface displayed in the display screen.

The at least one displayed character in the at least one region of the display screen may be representative of a determined numerical difference between the monetary value indicated by the at least one simulated user input and a monetary value required as payment.

The method may comprise determining the numerical difference and causing the numerical difference to be displayed as the at least one displayed character in the at least one region of the display screen.

The method may further comprise, in response to the at least one simulated user input, causing at least one further character representative of the monetary value determined using the at least one money item denominating apparatus to be displayed in at least one further region of the display screen.

The display screen may be a display screen of a money item processing apparatus. The money item processing apparatus may be a point-of-sale terminal.

This specification also provides an apparatus comprising: at least one computer processor; and at least one computer memory containing computer-executable instructions which, when executed by the at least one computer processor, cause the method to be performed.

This specification also provides a computer program comprising computer-executable instructions which, when executed by at least one computing apparatus, cause the method to be performed.

This specification also provides a system comprising: at least one money item storage region; at least one money item dispensing apparatus; and the computer program, wherein: causing to be dispensed the at least one money item comprises causing the at least one money item dispensing apparatus to dispense the at least one money item from the at least one money item storage region.

This specification also provides an apparatus for use in the system, comprising the at least one money item storage region and the at least one money item dispensing apparatus.

This specification also provides a computer readable storage medium storing computer-executable instructions which, when executed by at least one computing apparatus, cause the method to be performed. The computer readable storage medium may comprise a non-transitory storage medium.

This specification also provides a system comprising: at least one money item storage region; at least one money item dispensing apparatus; and the computer readable storage medium, wherein: causing to be dispensed the at least one money item comprises causing the at least one money item dispensing apparatus to dispense the at least one money item from the at least one money item storage region.

This specification also provides an apparatus for use in the system, comprising the at least one money item storage region and the at least one money item dispensing apparatus.

This specification also provides a method comprising: determining, using at least one money item denominating apparatus, a monetary value of at least one received money item; in response to determining the monetary value, automatically causing at least one simulated user input indicative of the determined monetary value to be provided to at least one interactive user interface displayed in at least one region of a display screen.

The method may comprise, in response to receipt of the at least one simulated user input indicative of the determined monetary value, displaying the determined monetary value in the user interface.

The at least one simulated user input may comprise an automated actuation of at least one interactive element of the user interface.

The at least one interactive element may comprise at least one key of a virtual keypad in the user interface.

Actuating the at least one key of the virtual keypad may comprise causing a simulated click action at a location of the at least one key of the virtual keypad.

The simulated click action may comprise at least one simulated mouse click or simulated touch input.

The automated actuation of the at least one interactive element may comprise automatically entering the determined monetary value into the interactive user interface.

The method may comprise entering, in response to the at least one simulated user input, at least one character representative of the determined monetary value into a text display region of the user interface.

The method may comprise: performing optical character recognition on the display screen to determine at least one displayed character indicative of the at least one simulated user input; and validating that the at least one displayed character indicative of the at least one simulated user input corresponds to the determined monetary value.

The method may comprise performing optical character recognition on at least one further region of the display screen to determine at least one displayed character.

The method may comprise identifying, from the determined at least one displayed character, a monetary value to be dispensed.

The method may comprise: in response to identifying the monetary value to be dispensed, causing to be dispensed at least one money item corresponding to the identified monetary value.

The method may comprise displaying, in the at least one further region of the display screen, the at least one displayed character.

The at least one displayed character may be representative of a numerical difference between the monetary value indicated by the at least one simulated user input and a monetary value required as payment.

The method may comprise determining the numerical difference.

The method may comprise displaying the at least one interactive user interface in the at least one region of the display screen.

This specification also provides an apparatus comprising: at least one computer processor; and at least one computer memory containing computer-executable instructions which, when executed by the at least one computer processor, cause the method to be performed.

This specification also provides a computer program comprising computer-executable instructions which, when executed by at least one computing apparatus, cause the method to be performed.

This specification also provides a system comprising: at least one money item denominating apparatus; and the computer program. The system may further comprise at least one money item storage region.

This specification also provides an apparatus for use in the system, comprising the at least one money item storage region and the at least one money item denominating apparatus.

This specification also provides a computer readable storage medium storing computer-executable instructions which, when executed by at least one computing apparatus, cause the method to be performed. The computer readable storage medium may comprise a non-transitory storage medium.

This specification also provides a system comprising: at least one money item denominating apparatus; and the computer readable storage medium. The system may further comprise at least one money item storage region.

This specification also provides an apparatus for use in the system, comprising the at least one money item storage region and the at least one money item denominating apparatus.

This specification also provides a method comprising: performing optical character recognition on at least one region of a display screen to determine at least one displayed character; identifying, from the determined at least one displayed character, a monetary value to be received; determining, using at least one money item denominating apparatus, a monetary value of at least one received money item; comparing the monetary value of the at least one received money item with the monetary value to be received; and in response to determining that the monetary value of the at least one received money item is equal to or greater than the monetary value to be received, restricting acceptance of further received money items.

Restricting acceptance of further received money items may comprise restricting acceptance of further money items received at the at least one money item denominating apparatus.

Restricting acceptance of further received money items may comprise rejecting further money items received at the at least one money item denominating apparatus.

Rejecting the further money items may comprise directing the further money items to a money item outlet for collection.

This specification also provides an apparatus comprising: at least one computer processor; and at least one computer memory containing computer-executable instructions which, when executed by the at least one computer processor, cause the method to be performed.

This specification also provides a computer program comprising computer-executable instructions which, when executed by at least one computing apparatus, cause the method to be performed.

This specification also provides a system comprising: at least one money item denominating apparatus; and the computer program.

The system may further comprise at least one money item storage region.

This specification also provides an apparatus for use in the system, comprising the at least one money item storage region and the at least one money item denominating apparatus.

This specification also provides a computer readable storage medium storing computer-executable instructions which, when executed by at least one computing apparatus, cause the method to be performed.

The storage medium may comprise a non-transitory storage medium.

This specification also provides a system comprising: at least one money item denominating apparatus; and the computer readable storage medium.

The system may further comprise at least one money item storage region.

This specification also provides an apparatus for use in the system, comprising the at least one money item storage region and the at least one money item denominating apparatus.

For the purposes of example only, embodiments are described below with reference to the accompanying figures. A brief description of these figures immediately follows.

DETAILED DESCRIPTION

The following disclosure is made in the context of a point-of-sale (POS) apparatus for facilitating monetary transactions. The POS apparatus can be used in a wide variety of different scenarios and allows for monetary transactions to be conducted in a resource-efficient, reliable and secure manner.

Figure 1:
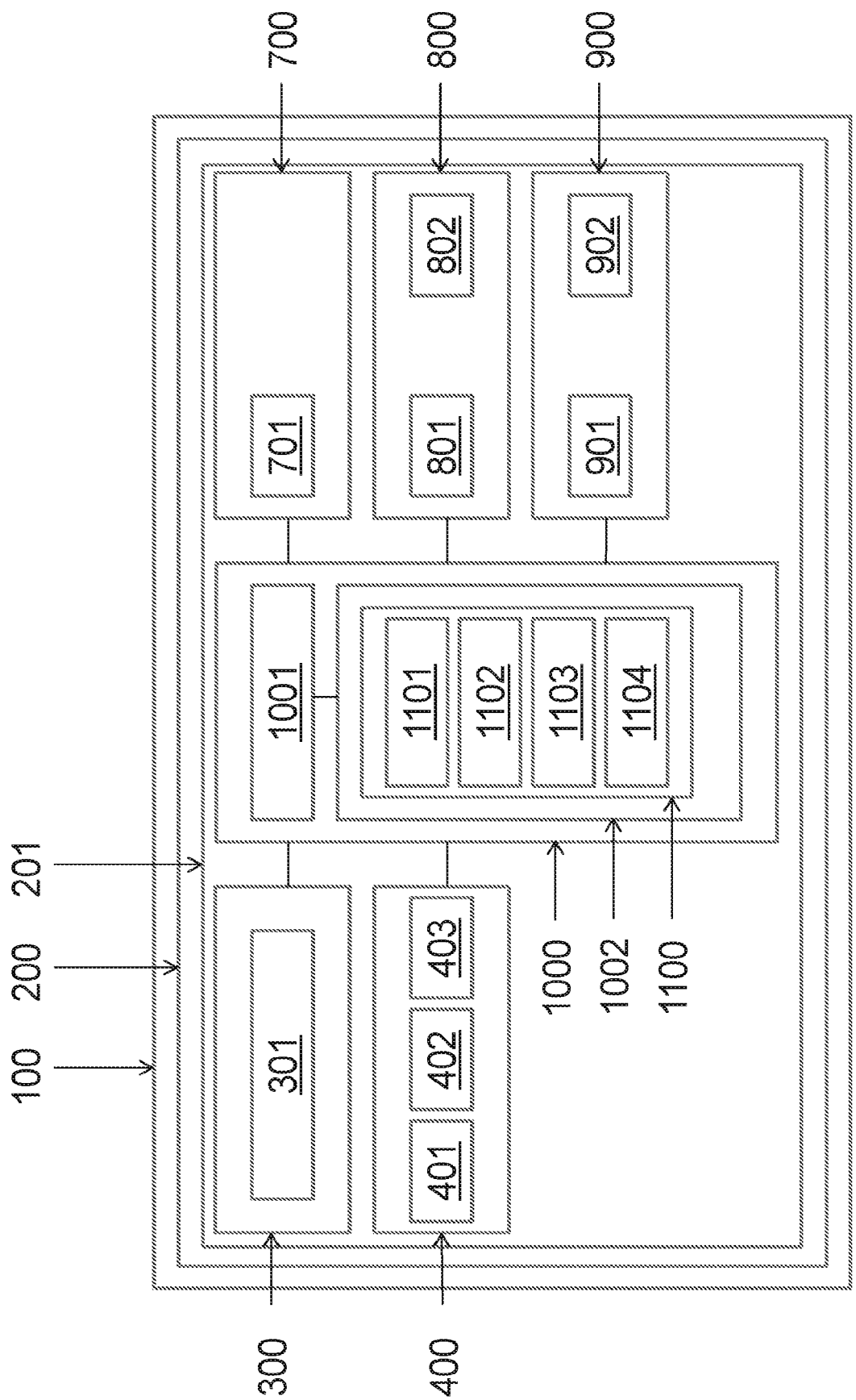
FIG. 1 is a schematic diagram of a point-of-sale apparatus including a point-of-sale terminal having a display.

An example of a POS apparatus 100 is schematically illustrated in FIG. 1. The POS apparatus 100 comprises a point of sale terminal 200, which comprises a display 300. The display 300 is configured to display transaction information to a user of the POS terminal 200. For example, the display 300 may comprise a colour display screen 301, such as an LCD or LED screen. The POS terminal 200 may also comprise at least one user input device 400, which may be used by a user of the terminal 200 to enter information into the POS terminal 200. For example, as shown in FIG. 1, the terminal 200 may comprise a touch-sensitive panel 401 such as a capacitive touch-sensitive panel. Such a touch panel 401 may be overlaid on the display screen 301 so that a user of the terminal 200 can use information displayed on the display screen 301 to provide touch inputs in corresponding regions of the touch panel 401 and thereby enter information into the POS terminal 200. The touch panel 401 may optionally be integrated with the display screen 301 as part of the display 300.

Additionally or alternatively to the touch panel 401, the POS terminal 200 may comprise one or more other user input devices 400, such as a physical keypad 402 for typing information into the terminal 200 and/or a computer mouse 403 with clickable buttons for making selections of items displayed on the screen 301.

The display screen 301 is configured to display one or more user interfaces of the POS terminal 200. The user interface(s) may be interactive, so that a user of the POS terminal 200 can provide interactive inputs to the user interface using one or more of the user input devices 400. This is discussed in more detail further below.

Figure 2:
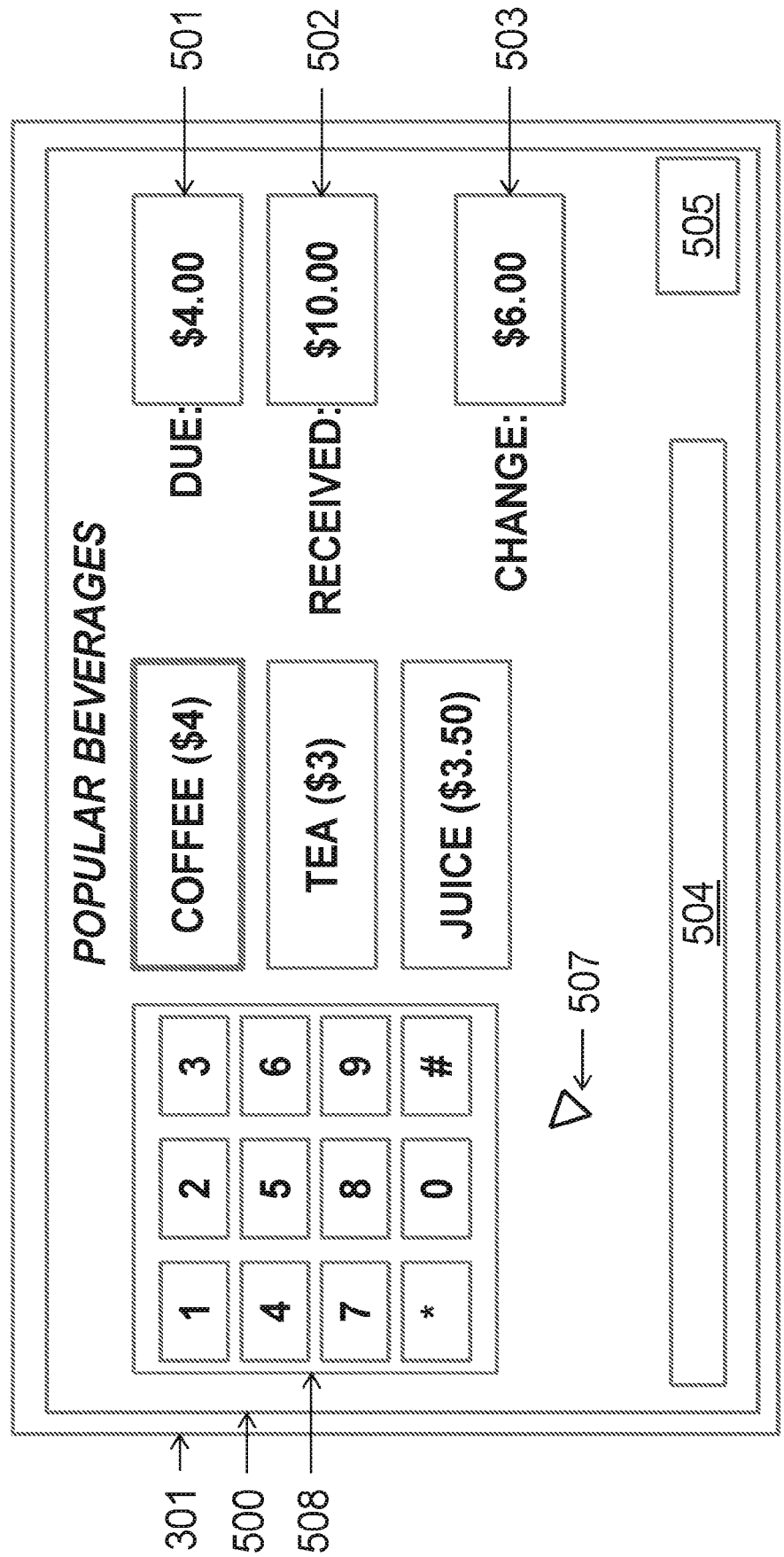
FIG. 2 is a schematic illustration of a user interface displayed on a display of a point-of-sale terminal.

An example of such a user interface 500, as displayed on the display screen 301 of the terminal 200, is schematically illustrated in FIG. 2. The user interface 500 displays transaction information which can be viewed by a user of the POS terminal 200. The transaction information includes monetary information relating to a current transaction being carried out at the POS terminal 200. For example, the user interface 500 of FIG. 2 comprises a first region 501 for displaying a monetary value of goods to be purchased, a second region 502 for displaying a monetary value received for the goods from a purchaser, and a third region 503 for displaying a monetary value to be dispensed to the purchaser. The monetary value to be dispensed to the purchaser corresponds to the difference between the monetary value received from the purchaser and the monetary value of the goods to be purchased. This is commonly referred to as 'change'. In a conventional POS terminal, a displayed 'change' value of this kind is used by the operator of the POS terminal to manually count out the correct value of change for the purchaser.

The user interface 500 of FIG. 2 is illustrated in the specific context of a coffee shop, where a customer wishes to purchase a coffee valued at $4 and has paid for the coffee using a $10 bill. The customer is due to receive change of $6. As such, in FIG. 2, the first region 501 of the user interface 500 displays a monetary value of $4, the second region 502 of the interface 500 displays a monetary value of $10 and the third region 503 of the interface 500 displays a monetary value of $6. It will be appreciated that the context of FIG. 2, as well as its specific layout and displayed information, is not a limiting example of the user interface 500.

As will be explained below, the transaction information displayed in the different regions 501-503 of the user interface 500 may be determined automatically in the POS terminal 200. Alternatively, at least in part, the transaction information may be manually inputted to the POS terminal 200 by a terminal operator, for example by using one or more of the user input devices 400 referred to above.

Referring back to FIG. 1, the POS terminal 200 may also comprise a money item dispensing apparatus 700. The money item dispensing apparatus 700 is configured to dispense money items from the POS terminal 200 into a money item output region 701, such as a collection tray or similar, for collection by the user of the terminal 200. As described below, the money item dispensing apparatus 700 may operate to automatically dispense money items to the output region 701 based on transaction information displayed on the display screen 301. This automatic functionality means that the dispensing apparatus 700 can take the place of a more conventional apparatus, such as retractable cash drawer, from which money items must be counted out manually. With this more conventional apparatus, the operator of the POS terminal 200 is required to open the cash drawer, or similar, to count out money items corresponding to the monetary value to be dispensed. This presents a security risk, which use of the automatic dispensing apparatus 700 described herein can help to reduce or avoid.

The dispensing apparatus 700 operates alongside one or more money item storage regions 800, in which money items are securely stored in the POS terminal 200. For example, the POS terminal 200 may contain one or more multi-denomination cash boxes 801 and/or one or more money item hoppers 802 from which money items can be dispensed by the money item dispensing apparatus 700 to the money item output region 701. The money item storage regions 800 may be contained within a secure housing 201 of the POS terminal 200 so that unauthorized access to the storage regions 800 from the exterior of the terminal 200 is prevented. For example, one or more keys may be required to unlock the housing 201 to access the money item storage regions 800.

The POS terminal 200 may also comprise a money item receiving apparatus 900. The money item receiving apparatus 900 is configured to receive money items input to the POS terminal 200 via a money item input region 901, such as a slot in the housing 201 of the terminal 200. The money item receiving apparatus 900 includes one or more money item denominators 902 for discriminating between different denominations of money items received by the receiving apparatus 900. These denominators 902 may, for example, comprise money item validators which are configured to determine the denomination and authenticity of each money item received at the money item receiving apparatus 900. Separate money item denominators 902 may be provided for denominating and validating different types of money item, such as coins and bills.

As with the money item dispensing apparatus 700, the money item receiving apparatus 900 operates alongside the money item storage regions 800 of the POS terminal 200. Money items which are received at the receiving apparatus 900 and determined to be authentic may be directed to the money item storage regions 800 for secure storage in the POS terminal 200. At a later time, these money items may be retrieved from the storage regions 800 and dispensed to the money item outlet region 701 by the dispensing apparatus 700.

Referring again to FIG. 1, the POS terminal 200 also comprises a computing apparatus 1000. The computing apparatus 1000 comprises at least one computer processor 1001 and at least one computer memory 1002, further details of which are given below. The memory 1002 contains computer-readable instructions 1100 which can be executed by the processor 1001 to cause operations to be performed in the POS terminal 200. The computer-readable instructions 1100 include user interface software 1101, which comprises instructions for implementing the user interface 500 at the display 300 of the POS terminal 200. The computer-readable instructions 1100 also include accounting software 1102, which comprises instructions for implementing accounting operations in the POS terminal 200. These accounting operations may comprise, for example, an automatic determination of the monetary 'change' value referred to above with respect to FIG. 2 based on a known monetary value of goods to be purchased and a known monetary value received at the POS terminal 200 as payment for the goods. The user interface software 1101 and the accounting software 1102 may share information in order to carry out their respective operations in the POS terminal 200. For example, with reference to FIG. 2, the user interface software 1101 may obtain the automatically determined 'change' value from the accounting software 1102 and, in response, cause the 'change' value to be displayed in the third region 503 of the user interface 500.

The user interface software 1101 and/or the accounting software 1102 may run in a native operating system of the terminal 200 and may be provided by the supplier or manufacturer of the POS terminal 200. For example, such software 1101, 1102 may be installed in the computing apparatus 1000 before the general installation of the POS terminal 200 at its point of use.

The computer-readable instructions 1100 stored in the memory 1002 of the POS apparatus 100 also include automatic dispensing software 1103, the operation of which causes the money item dispensing apparatus 700 to automatically dispense money items from the POS terminal 200 directly in response to information displayed on the display screen 301. The automatic dispensing software 1103 may run in the native operating system of the POS terminal 200 and communicates with the money item dispensing apparatus 700. As discussed below, the automatic dispensing software 1103 may allow the dispensing apparatus 700 to operate independently of other elements of the POS terminal 200. The automatic dispensing operations of the POS terminal 200 are described below with respect to FIGS. 3, 4 and 6.

Figure 1A:
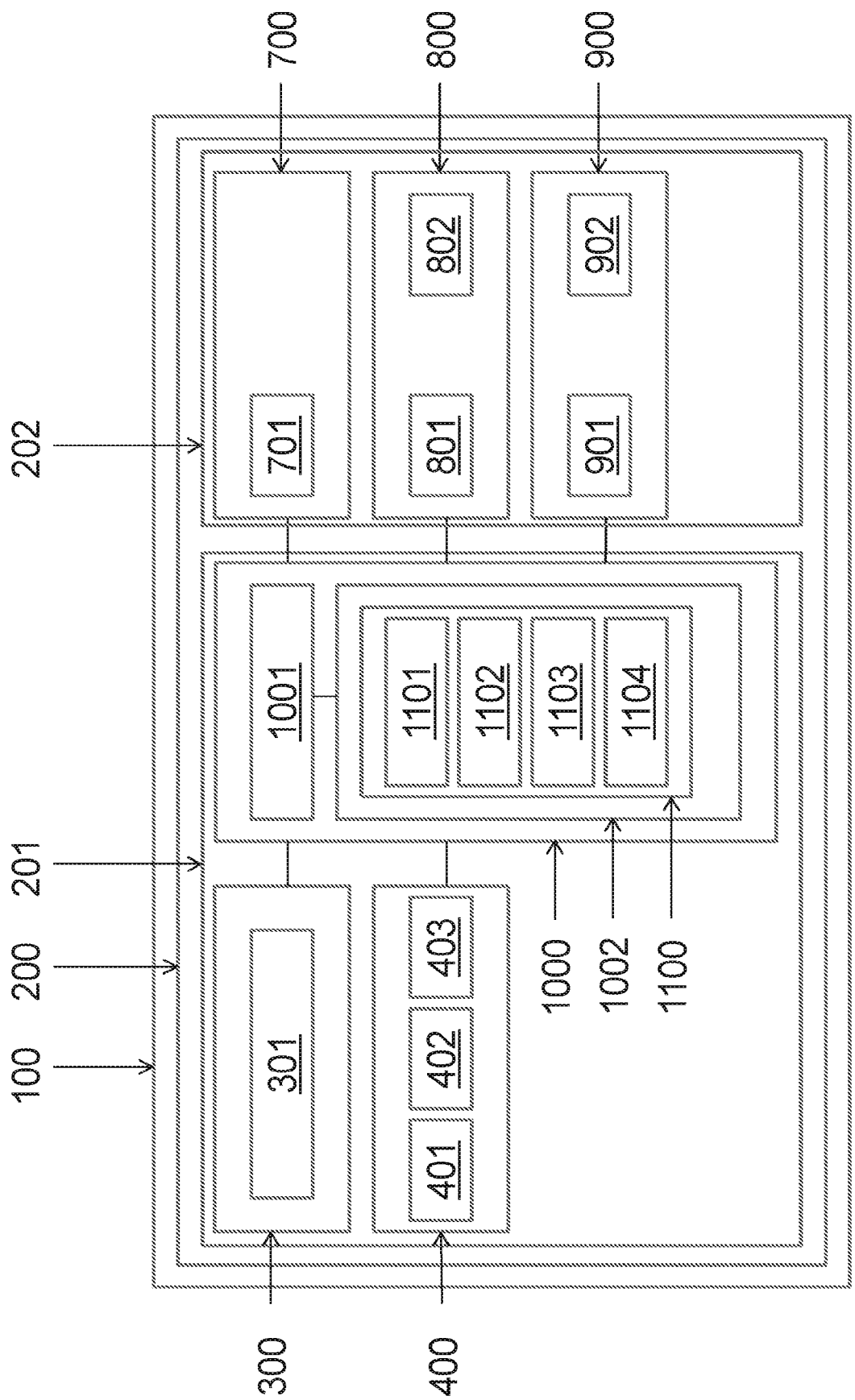
FIG. 1A is another schematic diagram of a point-of-sale apparatus including a point-of-sale terminal having a display.

The money item dispensing apparatus 700, money item storage regions 800 and money item receiving apparatus 900 are shown in FIG. 1 as being located within a secure housing 201 of the POS terminal 200. In FIG. 1, other elements of the POS terminal 200, including the display 300, the input device(s) 400 and the computing apparatus 1000 are also shown as being contained in the secure housing 201. However, another implementation is for the money item storage regions 800, the money item dispensing apparatus 700 and/or the money item receiving apparatus 900 to be contained in a second secure housing 202 of the POS terminal 200, separately from the other elements of the POS terminal 200. An example of such an implementation is illustrated in FIG. 1A, in which the POS terminal 200 comprises a first secure housing 201 containing at least the display 300, the user input device(s) 400 and the computing apparatus 1000, and a second secure housing 202 containing at least the dispensing apparatus 700 and the money item storage regions 800. Additionally or alternatively to the money item dispensing apparatus 700, the second secure housing 202 may contain the money item receiving apparatus 900, as shown in FIG. 1A. In this type of implementation, the second secure housing 202, containing the elements of the terminal 200 referred to above, may conveniently be supplied and/or installed separately to the elements of the POS terminal 200 located in the first secure housing 201. A suitable communication interface, such as a suitable data port in each housing 201, 202, may facilitate communication between the computing apparatus 1000 in the first housing 201 and the various elements of the second housing 202. In this way, the two housings 201, 202 may be located side by side in the POS terminal 200.

The POS terminal 200 may be configured to dispense a monetary value from the POS terminal 200 directly from information displayed on the display screen 301 of the terminal 200. The displayed information used to determine the monetary value to be dispensed may, for example, be present in the user interface 500 of the POS terminal 200. The determination and subsequent dispensing of the monetary value may be automatic and carried out using the automatic dispensing software 1103 stored in the memory 1002 of the computing apparatus 1000. As will be explained below, by automatically determining the monetary value to be dispensed directly from visible content on the display screen 301, the automatic dispensing software 1103 and the dispensing apparatus 700 can operate independently of other elements of the POS terminal 200, including the user interface software 1101 and the accounting software 1102 referred to above.

The POS terminal 200 may be configured to determine a monetary value to be dispensed by the dispensing apparatus 700 by automatically recognising characters displayed on the display screen 301. In particular, the automatic dispensing software 1103 running in the POS terminal 200 may be configured to automatically recognise displayed characters which are indicative of a monetary value to be dispensed. This recognition process includes performing optical character recognition (OCR) on all or part of the display screen 301 of the POS terminal 200.

Figure 3:
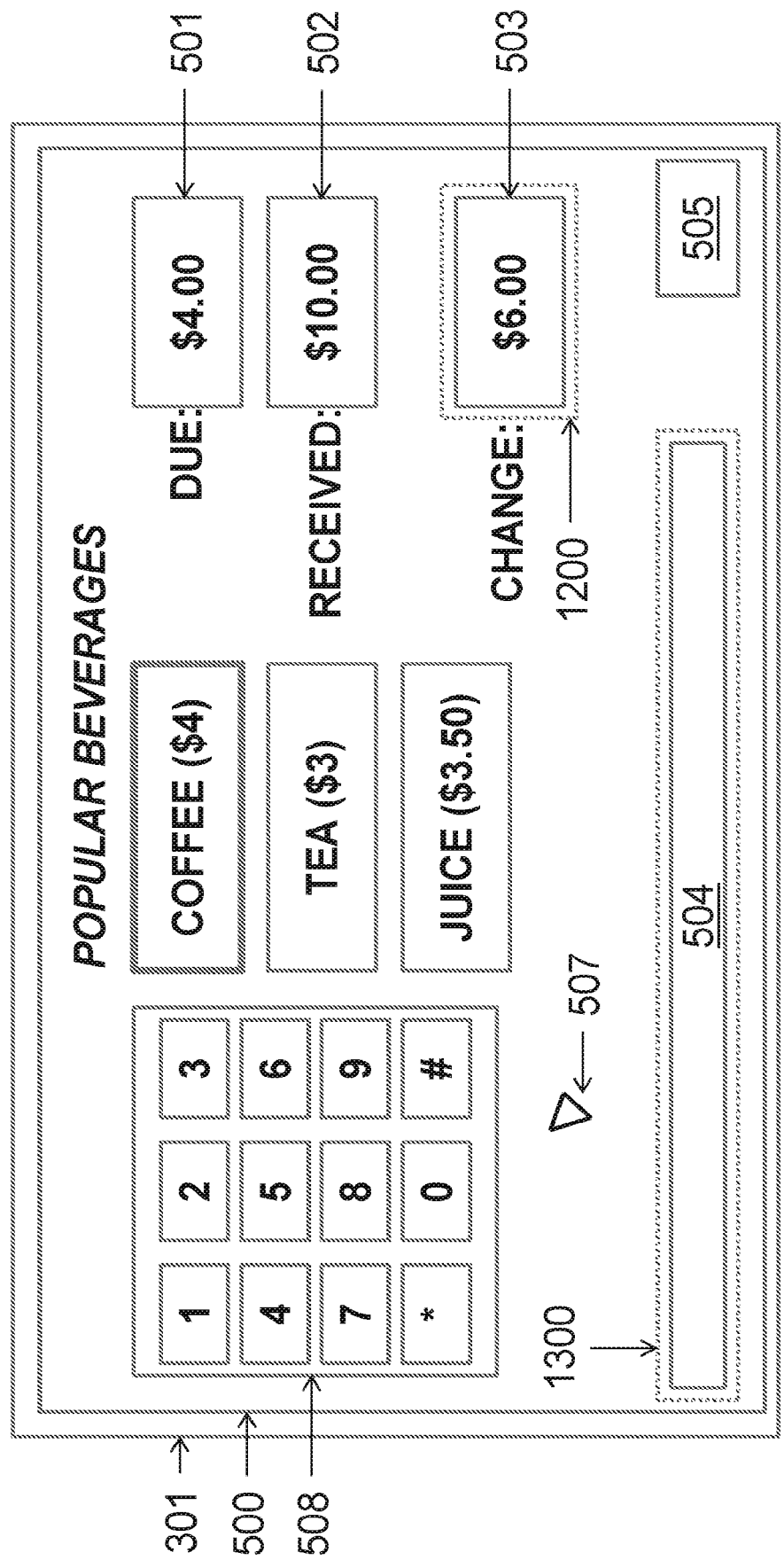
FIG. 3 is a schematic illustration of a user interface displayed on a display of a point-of sale-terminal, in which locations of content capture and recognition windows are indicated.

For example, referring to FIG. 3, OCR may be performed on an area of the display screen 301 which is within a virtual recognition window 1200. This area may correspond to a particular region of the user interface 500. The OCR process may be confined to the area of the display screen 301 within the virtual recognition window 1200. This helps to ensure that the OCR process is efficient and does not expend computer resources on recognising characters in areas of the screen 301 which do not contain information relevant to the determination of a monetary value to be dispensed. The size and placement of the recognition window 1200 relative to the user interface 500, or the display screen 301 more generally, may be configurable by an administrator of the POS terminal 200. This allows the recognition window 1200 to be accurately positioned and sized over the relevant areas of the display screen 301. This may be advantageous because the relevant areas of the screen 301 may vary in dependence of the specific layout of the user interface 500 used in the POS terminal 200.

In normal use of the POS terminal 200, for example during a transaction, the recognition window 1200 is substantially transparent on the display screen 301. The transparency of the recognition window 1200 means that it is not visible to the naked eye and, as such, means that the presence of the recognition window 1200 does not in any way impede the general visibility of the user interface 500, or other information displayed on the screen 301, to the user of the POS terminal 200. The recognition window 1200 may, however, be visible in a configuration mode of the window 1200 for the purposes of positioning and sizing the window 1200 over the desired region(s) of the user interface 500.

There are various techniques by which the character recognition process may be carried out, some of which are described below. In all of these techniques, it will be understood from the following discussion that the virtual recognition window 1200, or any alternative means of identifying the areas of the display screen 301 to be recognised using OCR, encompasses a region of the display screen 301 which displays an indication of the monetary value to be dispensed. For example, in the display screen 301 illustrated in FIG. 3 the recognition window 1200 (shown in dashed lines) is confined to the third region 503 of the user interface 500. This has the effect that, when OCR is carried out, all characters displayed within the third region 503 of the user interface 500 are determined using OCR. These characters include those characters which indicate the monetary value to be dispensed.

The determination of characters displayed on the display screen 301 using the OCR process may be triggered manually. For example, the POS terminal 200 may perform OCR on the region of the display screen 301 encompassed by the recognition window 1200 in response to a user input provided to the POS terminal 200 via a user input device 400. The user input may be provided, for example, by a user of the POS terminal 200 when he/she observes from the display screen 301 that a monetary value is due to be dispensed to a purchaser. In the example of FIGS. 2 and 3, such an observation could be the presence of alphanumeric characters, or other text characters, indicating a number greater than zero in the third region 503 of the user interface 500, i.e. an indication that the purchaser is due to receive 'change'.

Alternatively, the determination of characters displayed on the display screen 301 using the character recognition process may be triggered automatically. The automatic trigger may be time-based. For example, the OCR process may be triggered at regular or otherwise predetermined time intervals, so that the POS terminal 200 performs OCR on the displayed contents of the screen 301 within the recognition window 1200 each time a fixed time period has elapsed.

The automatic trigger may alternatively be an event on the screen 301. For example, the OCR process may be automatically triggered by the automatic dispensing software 1103 in response to a change in the visual appearance of the display screen 301, so that the POS terminal 200 performs OCR on the region of the screen 301 within the recognition window 1200 each time the appearance of the screen 301 is identified as having changed in a particular way. The POS terminal 200 may be configured to identify such changes in the appearance of the display screen 301 by, for example, capturing a regular screenshot of the display screen 301 and comparing each newly-captured screenshot with the preceding one to identify whether a change in the appearance of the display screen 301 has occurred. These visual comparisons may be carried out under the control of the automatic dispensing software 1103 and may be confined to particular regions of the screenshots. For example, the comparison may be confined to a region of the captured screen 301 which is known to provide a visual indication of whether a monetary value needs to be dispensed. This may be a region of the screen 301 which is known to change its visual appearance from a first state to a second state whenever a monetary value is due to be dispensed.

An example of such a change in visual appearance is a change in the colour of a particular region of the display screen 301. For example, the user interface 500 illustrated in FIG. 3 comprises an indication region 504 which changes colour whenever a monetary value is due to be dispensed from the POS terminal 200. Another example of a change in visual appearance is the display of an image or other visual indicator, such an icon, indicating that a monetary value is due to be dispensed. Such a visual indicator may appear in a further indication region 505 of the user interface 500 whenever an adequate monetary value has been received at the POS terminal 200 as payment for particular goods. A specific example of a visual indicator that appears in the further indication region 505 is a 'tick' or a similar icon. The 'tick' may be a specific colour, such as green, and the OCR process may be automatically triggered only when both the shape of the 'tick' and its associated colour, such as green, are present in the further indication region 505.

Another example of a change in the visual appearance of the display 301 is a change in displayed characters. Such characters may comprise alphanumeric characters, or may comprise other alphabetic characters such as Japanese or Chinese language characters. The characters may additionally or alternatively comprise special characters, such as currency characters (e.g. $, £, €) or punctuation characters. Such changeable characters may be one or more characters which indicate a monetary value to be dispensed from the POS terminal 200, such as the alphanumeric text inside the third region 503 of the user interface 500 discussed above and shown in FIGS. 2 and 3. The third region 503 of the user interface 500 may therefore serve as a further indication region similar to those 504, 505 discussed above in relation to colour and image changes. For example, referring to FIG. 3, the alphanumeric text characters in the third region 503 of the user interface 500 may change from an initially displayed value of "$0.00" to a higher value, such as "$6.00", whenever a monetary value is due to be dispensed from the POS terminal 200. By comparing the visual appearance of the third region 503 of the user interface 500 captured in successive screenshots of the screen 301, the automatic dispensing software 1103 is configured to determine when there has been a change in appearance which is indicative of a need to dispense a monetary value.

The screenshots referred to above may comprise the entire area of the display screen 301, or may alternatively comprise only a partial area of the display screen 301. In both instances, the screenshots contain an image of at least one region 503-505 of the screen 301 which is known to indicate whether a monetary value is due to be dispensed. The size and position of the screenshots relative to the display screen 301 may be set by a screenshot capture window 1300. An example of such a capture window 1300 is shown in dashed lines in FIG. 3. As with the recognition window 1200 discussed above, the size and placement of the capture window 1300 relative to the user interface 500, or the display screen 301 more generally, is configurable by an administrator of the POS terminal 200 in a configuration mode. It will be appreciated that the size and placement of the recognition window 1200 and the capture window 1300 may, in some implementations, be the same. An example of this is where both the capture window 1300 and the recognition window 1200 are positioned specifically over the third region 503 of the user interface 500.

The comparison of successive screenshots may be made for the purposes of determining only whether there has been a change in the visual appearance of the screen 301. As such, even in an example which involves comparing regions of text characters, it may not be necessary to perform OCR in order to identify an appearance change. A less resource-intensive technique may instead be used, such as a subtraction of one screenshot from the other. It will be appreciated, however, that in the 'text character' example OCR is one technique by which a change in visual appearance may be determined.

In response to the occurrence of a trigger event, whether it be a manual trigger received from a user of the POS terminal 200, or an automatic trigger such as the elapse of a pre-set time period or the identification of a change in the visual appearance of a region 503-505 of the display-screen 301, the POS terminal 200 performs character recognition on the area of the display screen 301 within the recognition window 1200. In the example of FIG. 3, the recognition window 1200 includes within its boundary the third region 503 of the user interface 500 displayed on the display screen 301. As such, the POS terminal 200 identifies each of the plurality of alphanumeric characters displayed in the third region 503 of the interface 500. In the example of FIG. 3, these characters are "$6.00".

It will be appreciated that although the recognition window 1200 has been described above as being overlaid on the live display screen 301 of the terminal 200, it could in an alternative implementation be overlaid on the most recent screenshot of the screen 301.

The characters recognised in the OCR process correspond to the monetary value to be dispensed from the POS terminal 200 using the money item dispensing apparatus 700. In response to this value being determined from the OCR process, the automatic dispensing software 1103 running in the computing apparatus 1000 of the POS terminal 200 is configured to cause the dispensing apparatus 700 to dispense money items of the determined value into the money item output region 701 of the terminal 200. For example, the automatic dispensing software 1103 may be configured to cause the computing apparatus 1000 to send an appropriate payout instruction to the dispensing apparatus 700 over a communication coupling between the computing apparatus 1000 and the dispensing apparatus 700. Any suitable communication coupling may be used, as known in the art. The instruction may be encrypted using a key which is known to the automatic dispensing software 1103 and the dispensing apparatus 700.

In this manner, the dispensing apparatus 700 may be controlled to automatically dispense monetary values to the money item output region 701 of the POS terminal 200 without the need for the protocols of the dispensing apparatus 700 to be supported natively in the other POS software. For example, the dispensing apparatus 700 may promptly and accurately dispense monetary amounts without communicating with the user interface software 1101 or the accounting software 1102. Indeed, with the exception of the automatic dispensing software 1103, the dispensing apparatus 700 may be able to operate without communicating with other elements of the POS terminal 200. This means that the characteristics of the communication between the dispensing apparatus 700 and the computing apparatus 1000 can be individual to the dispensing apparatus 700. It will be appreciated that such individual communication characteristics for the dispensing apparatus 700 may provide increased security against fraud attacks on the POS terminal 200. For example, the manner in which the dispensing apparatus 700 communicates with the automatic dispensing software 1103 may be unknown to other elements of the terminal 200, including the other software applications discussed above. The result of this may be that, even if a potential fraudster has access to communication keys and/or protocols used elsewhere in the terminal 200, he/she may still have no way of fraudulently causing the dispensing apparatus 700 to make a monetary payout.

The discussion of the POS terminal 200 has so far been made in the context of the POS terminal 200 making an automatic calculation of the monetary value to be displayed in the third region 503 of the user interface 500. This automatic calculation is made, for example, using the accounting software 1102 referred to above. The accounting software 1102 determines the value as the difference between the value of the goods to be purchased and the value of money items received at the POS terminal 200 as payment for the goods. The determined value is then passed to the user interface software 1102, which causes the value to be displayed in the third region 503 of the user interface 500.

It has been mentioned that the value of monetary items received at the POS terminal 200 may be input to the POS terminal 200 either manually, for example by use of a user input device 400, or automatically using a money item denominator 902. The following explanation provides a technique by which the value of money items received at the POS terminal 200 may be input to the POS terminal 200 and displayed on the display screen 301 automatically. The technique allows a money item receiving apparatus 900, comprising one or more money item denominators 902, to operate substantially independently of other elements of the POS terminal 200 in a similar fashion to that described above with respect to the money item dispensing apparatus 700.

Referring again to FIG. 1, the computer-readable instructions 1100 stored in the memory 1002 of the computing apparatus 1000 may also include automatic monetary value entry software 1104. The monetary value entry software 1104 comprises instructions for causing one or more simulated operator inputs to be input to the POS terminal 200. The simulated inputs cause monetary values automatically determined at the money item receiving apparatus 900 to be entered into the POS terminal 200 via one or more interactive elements of the user interface 500 displayed in the display screen 301. The automated inputs to the user interface 500 simulate the input actions of a terminal operator using an input device 400, for example after the operator has manually counted a monetary value received from a purchaser.

There are various techniques by which the operator inputs may be simulated at the user interface 500, some of which are described below.

As previously discussed, one or more money item denominators 902 of the money item receiving apparatus 900 may be configured to determine the denominations and authenticity of money items input to the POS terminal 200 via the money item input region 901. Each money item which is denominated and validated as authentic at the receiving apparatus 900 is registered by the monetary value entry software 1104 running in the computing apparatus 1000 of the POS terminal 200. For example, a suitable communication coupling between the money item receiving apparatus 900 and the computing apparatus 1000 facilitates messages to be sent from the money item receiving apparatus 900 to the monetary value entry software 1104 in the computing apparatus 1000. The monetary value entry software 1104 responds to the receipt of one or more authentic money items at the receiving apparatus 900 by causing one or more simulated user inputs to be made to the user interface 500.

The simulated user input(s) may be simulated inputs of an input device 400 of the terminal 200. For example, in response to the receipt of an authentic money item at the receiving apparatus 900, the POS terminal 200 may be caused to control a pointer 507 displayed on the screen 301 to enter the received monetary value into a virtual keypad 508 or other interactive element of the user interface 500. This simulates the action of an operator of the terminal inputting a monetary value to the virtual keypad 508 by use of a computer mouse 403 or a touch-sensitive panel 401.

It will be appreciated that by automating the input of received monetary amounts to the user interface 500 in this manner, an operator of the terminal 200 may not be required. Furthermore, by simulating inputs from an operator of the terminal 200 to the user interface 500, the automatic monetary value entry software 1104 is able ensure that the monetary values received as payment for goods at the POS terminal 200 are passed to the user interface software 1101 and accounting software 1102 without the need for the money item receiving apparatus 900 to communicate directly with these elements of the terminal 200. The money item receiving apparatus 900 may instead operate substantially independently of these elements of the terminal 200. There is no requirement for a common communication protocol or similar between the money item receiving apparatus 900 and the various other elements of the POS terminal 200.

In order to validate that the simulated user inputs have been successful in entering monetary amounts to the user interface 500 as-intended, the automatic monetary value entry software 1104 may perform optical character recognition on the display screen 401. This may allow the automatic monetary value entry software 1104 to check that a monetary amount which has been displayed on the display screen 401 as a result of one or more simulated user inputs is as-intended. For example, the monetary value entry software 1104 may cause optical character recognition to be performed on the second region 502 of the user interface 500 described above with respect to FIGS. 2 and 3. The monetary value indicated by the recognised characters may then be compared against the monetary value that was intended for input via the simulated user inputs and, if there is a match, the monetary value entry software 1104 may validate that the intended amount has been successfully entered to the user interface 500.

In addition, or as an alternative, to the aspects described above relating to simulated user inputs, the automatic monetary value entry software 1104 may be further configured to control acceptance of money items at the money item receiving apparatus 900 based on information displayed on the display screen 401. For example, based on information displayed on the display screen 401, the software 1104 may be configured to cause money items newly received at the money item receiving apparatus 900 to be accepted and/or rejected. The information displayed on the display screen

401 may be determined by the monetary value entry software 1104 using optical character recognition.

For example, the automatic monetary value entry software 1104 may be configured to determine whether an adequate monetary value of money items has been received at the money item receiving apparatus 900 as payment for particular goods or services. Based upon this determination, the automatic monetary value entry software 1104 may be configured to automatically cause the money item receiving apparatus 900 to accept and/or reject further money items received at the money item receiving apparatus 900. If, based upon information determined from the display screen 401 by optical character recognition, the automatic monetary value entry software 1104 determines that a monetary value received at the money item receiving apparatus 900 is equal to or greater than a monetary value required for completing a transaction at the POS terminal 200, the software 1104 may control the money item receiving apparatus 900 to reject further money items received at the apparatus 900. For example, the software 1104 may cause the money item receiving apparatus 900 to automatically direct such excess money items into a money item outlet region of the POS terminal 200, such as a collection tray.

In order to aid the understanding of the reader, a technique by which the automatic monetary value entry software 1104 may control the money item receiving apparatus 900 is described below with respect to FIG. 2. As previously described, in the example of FIG. 2, an amount of $4.00 is displayed in the first region 501 of the user interface 500. The value of $4.00 represents a monetary value to be received as payment for a particular item, in this instance a cup of coffee. In order to complete the transaction, money items may be supplied to the money item receiving apparatus 900. In the example of FIG. 2, an amount of $10.00 is displayed in the second region 502 of the user interface 500. This represents a monetary value of money items received at the money item receiving apparatus 900 as payment for the cup of coffee.

In order to ensure that the value of money items supplied to the money item receiving apparatus 900 does not unnecessarily exceed the monetary value required in order to complete the transaction, the monetary value entry software 1104 may cause optical character recognition to be performed on the first region 501 of the user interface 500 in order to determine the displayed characters representative of the monetary value required as payment for the cup of coffee. The software 1104 may then determine a running total of the monetary value of money items received at the money item receiving apparatus 900 as payment for the cup of coffee. On an ongoing basis, the software 1104 may compare the running total of the monetary value received at the money item receiving apparatus 900 with the monetary value to be received for the cup of coffee, as determined by performing optical character recognition on the first region 501 of the user interface 500.

The comparison may be achieved, for example, by performing optical character recognition on the second region 502 of the user interface 500 to determine and monitor the running total of the value of money items received at the money item receiving apparatus 900 as payment for the cup of coffee.

In response to determining that the monetary value of money items received as payment for the cup of coffee at the money item receiving apparatus 900 is equal to or greater than the value of the cup of coffee displayed in the first region 501 of the user interface 500, the software 1104 may restrict acceptance of further money items at the money item receiving apparatus 900. In particular, the software 1104 may control the money item receiving apparatus 900 to not accept further money items once the total value of money items received for the cup of coffee (e.g. as displayed in the second region 502 of the user interface 500) exceeds the monetary value displayed in the first region 501 of the user interface 500. Such excess money items may be immediately directed by the money item receiving apparatus 900 to a money item outlet path, leading to a collection tray or similar.

Recognition of the characters in the first and/or second regions 501, 502 of the user interface 500 may be implemented using one or more further capture windows 1200 of the type described in detail above with respect to FIG. 3. For example, a first further capture window 1200 may be positioned over the first region 501 of the user interface 500 and a second capture window 1200 may be positioned over the second region 502 of the user interface 500.

Figure 4:
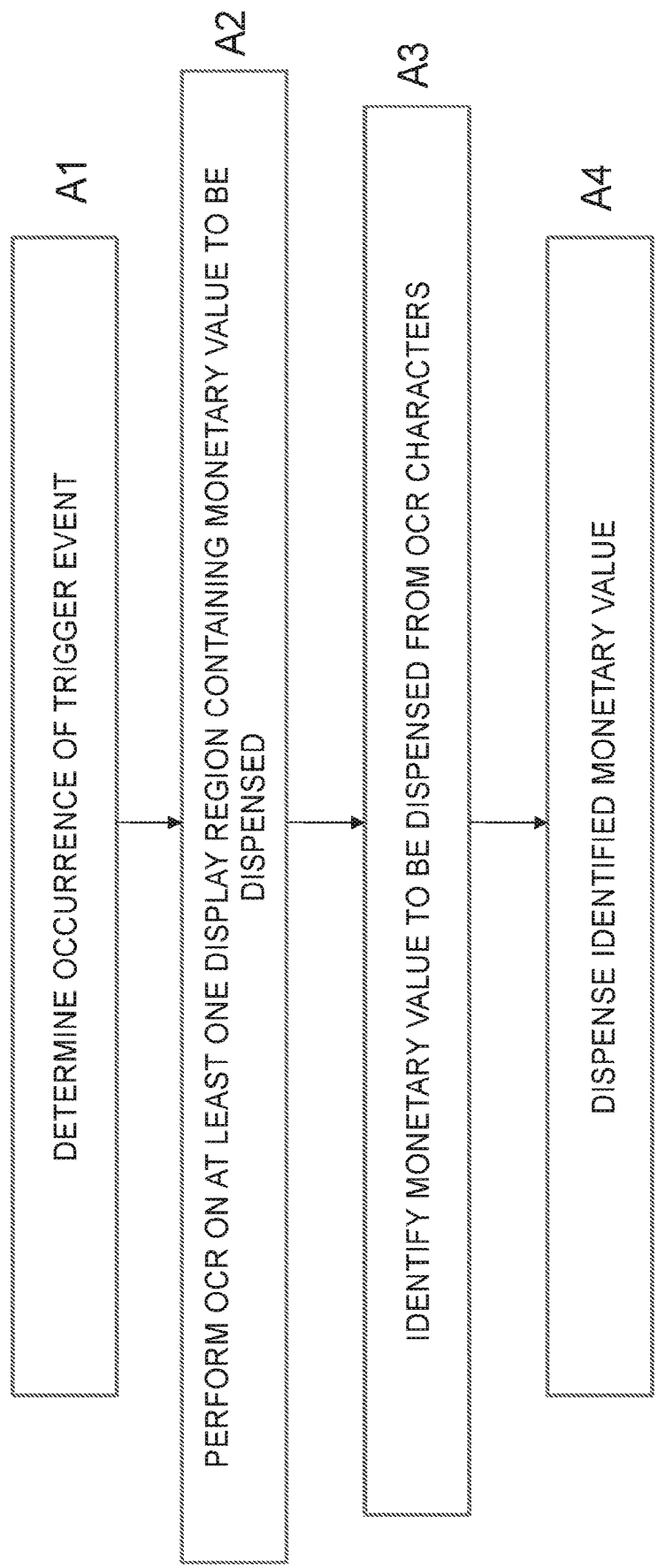
FIG. 4 is a flow diagram of a method of determining, from information displayed on a display of a point-of-sale terminal, a monetary value to be dispensed from the terminal.
Figure 5:
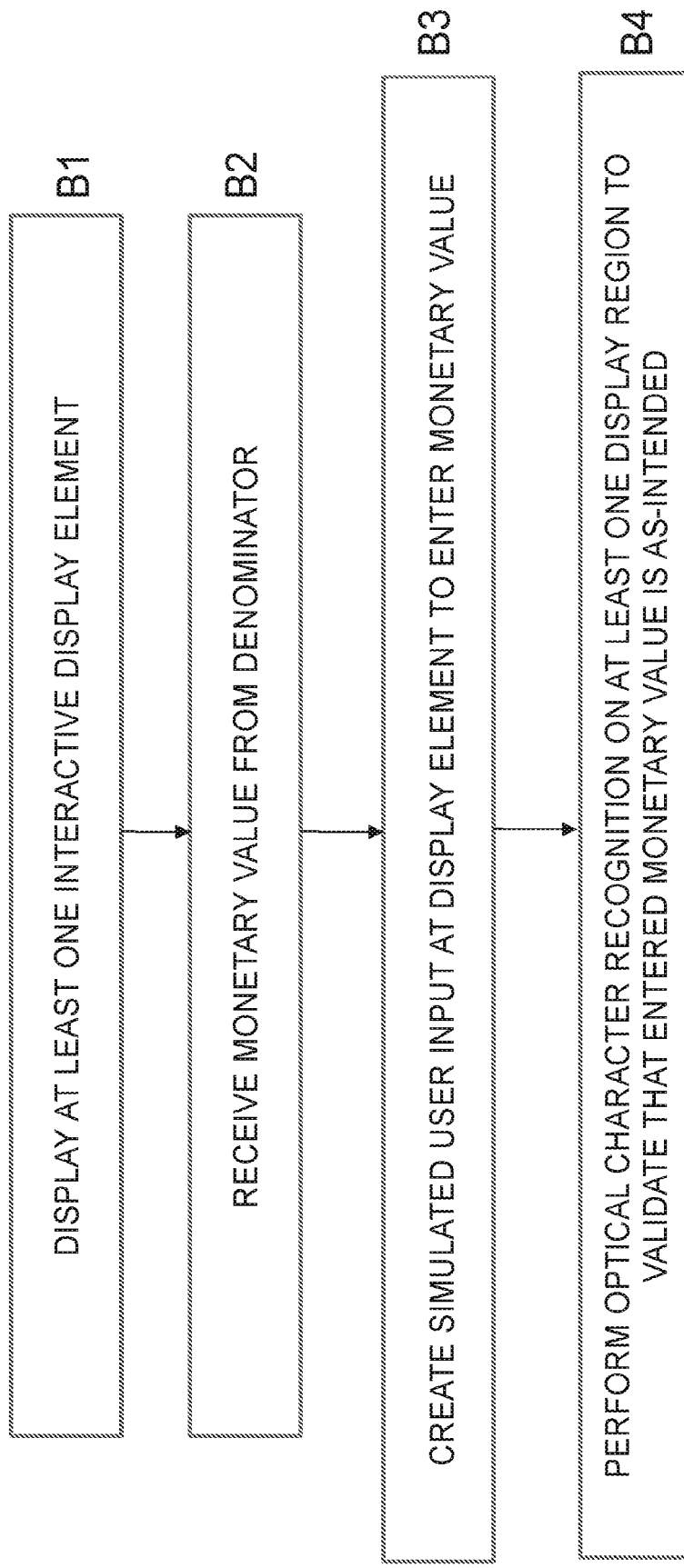
FIG. 5 is a flow diagram of a method of inputting a value of received money items to an interactive user interface of a point-of-sale terminal using one or more simulated user inputs.
Figure 6:
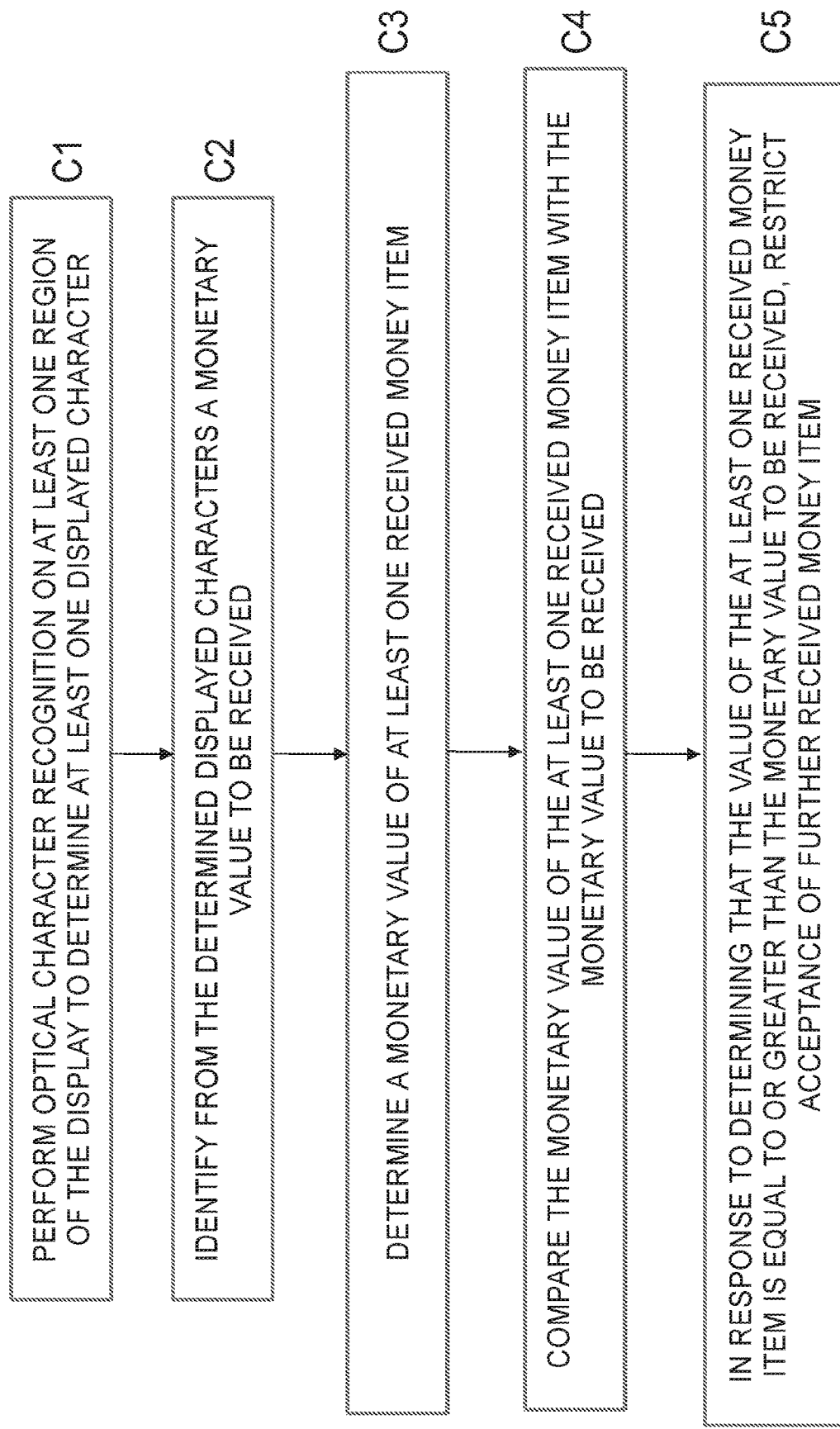
FIG. 6 is a flow diagram of a method of controlling a money item receiving apparatus based on information determined from a display of a point-of-sale terminal.

The above described aspects of the method and apparatus are discussed below with respect to the flow diagrams in FIGS. 4 to 6. Initially, a method of automatically dispensing money items from the dispensing apparatus 700 is described with respect to FIG. 4.

In a first stage A1 of the method, the POS terminal 200 determines that a trigger event has occurred. The trigger event signifies that a monetary value is due to be dispensed from the POS terminal 200 to the money item output region 901. As discussed above, the occurrence of the trigger event may be determined from a user input to the terminal 200, or may be automatically determined without user intervention. For example, the trigger event may be the elapse of a predetermined period of time, or a change in the appearance of the display screen 301.

In a second stage A2, the POS terminal 200 responds to the occurrence of the trigger event by performing optical character recognition of a region 503-505 of the display screen 301. For example, as described above, the POS terminal 200 may perform optical character recognition on all displayed contents of the screen 301 within a virtual recognition window 1200 overlaid on the user interface 500 of the POS terminal 200.

In a third stage A3, the POS terminal 200 identifies a monetary value to be dispensed from the characters which were optically recognised in the second stage A2. The terminal 200 may, for example, be configured to identify the monetary value to be dispensed as the numerical value indicated by the recognised characters.

In a fourth stage A4, the POS terminal 200 dispenses to the money item outlet region 701 money items to the monetary value identified in the third stage A3. For example, the dispensing apparatus 700 may respond to an instruction from the computing apparatus 1000 to dispense the money items.

A method of automatically entering monetary values received at the money item receiving apparatus 900 into the user interface 500 of the POS terminal 200 is described below with respect to FIG. 5.

In a first stage B1, the POS terminal 200 displays in the display screen 301 at least one interactive element such as the virtual keypad 508 referred to above.

In a second stage B2, the computing apparatus 1000 of the POS terminal 200 receives a value of one or more money items which have been denominated at the money item receiving apparatus 900. As described above, these values may be received by automatic monetary value entry software 1104 running in the computing apparatus 1000.

In a third stage B3, the computing apparatus 1000 of the POS terminal 200 responds to the receipt of the value of the one or more money items denominated at the money item receiving apparatus 900 by causing the received monetary value to be automatically entered into the user interface 500 by simulated user input. In particular, as described above, the automatic monetary value entry software 1104 running in the computing apparatus 1000 may cause simulated operator inputs to be created at one or more interactive elements 508 of the user interface 500 to enter the received monetary value. This simulates an operator of the terminal 200 typing, or otherwise entering, monetary values into the user interface 500 by use of one or more of the input devices 400 previously described. The monetary value is then displayed in the second region 502 of the user interface 500 by the user interface software 1101, and may be used by the accounting software 1102 to calculate a 'change' value to be dispensed from the terminal 200.

In a fourth stage B4, the automatic monetary value entry software 1104 running in the computing apparatus 1000 may cause the monetary value displayed in the second region 502 of the user interface 500 to be validated against the monetary value received at the money item receiving apparatus 900. For example, as discussed above, the automatic monetary value entry software 1104 may cause optical character recognition to be performed on the second region 502 of the user interface 500 and, from the recognised characters, may derive a monetary value. This derived monetary value may be checked against the monetary value that was intended to be input to the interface 500 by simulated user input. The monetary value entry software 1104 may validate that the automated entry by simulated user input has been successful upon finding a match between the value derived from the screen 401 and the intended value, or otherwise upon finding an expected correspondence between the value received at the receiving apparatus 900 and the value derived from the screen 401.

A method of controlling acceptance of money items at the money item receiving apparatus 900 based on information displayed on the display screen 401 of the POS terminal 200 is described below with respect to FIG. 6.

In a first stage C1, the automatic monetary value entry software 1104 causes the computing apparatus 1000 to perform optical character recognition on a region 501 of the display screen 401 displaying characters indicative of a monetary value to be received as payment at the POS terminal 200.

In a second stage C2, the software 1104 causes the computing apparatus 1000 to identify, from the displayed characters determined in the first stage C1, the monetary value to be received.

In a third stage C3, the software 1104 may communicate with the money item receiving apparatus 900 to maintain a running total of the value of money items received as payment at the money item receiving apparatus 900. Additionally or alternatively, the software 1104 may cause the computing apparatus 1000 to perform optical character recognition on a region 502 of the display screen 401 displaying characters indicative of the running total of the value of money items received at the money item receiving apparatus 900.

In a fourth stage C4, the software 1104 causes the computing apparatus 1000 to compare, in a continuous fashion, the running total of the value of money items received as payment at the money item receiving apparatus 900 with the monetary value to be received as payment, as determined by performing optical character recognition on the region 501 of the display screen 401 in the first and second stages C1, C2.

In a fifth stage C5, in response to determining that the value of received money items is equal to or greater than the monetary value to be received as payment, the software 1104 is configured to control the money item receiving apparatus 900 to restrict acceptance of further received money items. In particular, as described above, the software 1104 may cause the money item receiving apparatus 900 to not accept further money items as payment and, instead, to direct such excess money items to a collection tray or similar.

Figure 7:
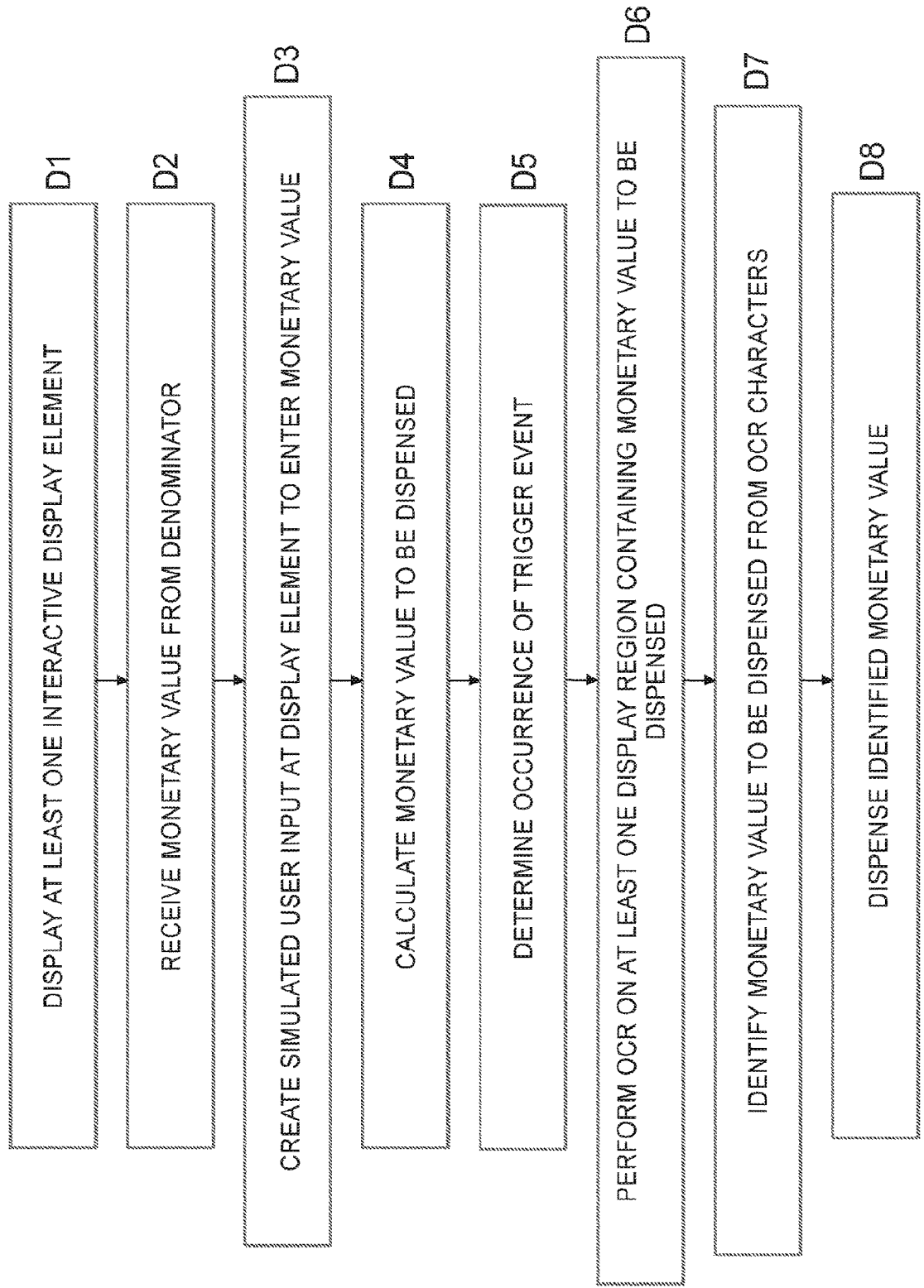
FIG. 7 is a flow diagram of a method of inputting a value of received money items to an interactive user interface of a point-of-sale terminal using one or more simulated user inputs, and, in response, determining, from information displayed in the user interface, a monetary value to be dispensed from the terminal.

A combined method of automatically entering monetary values received at the money item receiving apparatus 900 into the user interface 500 of the POS terminal 200 and subsequently automatically dispensing money items from the dispensing apparatus 700 to a money item output region 701 of the POS terminal 200 is described below with respect to FIG. 7.

In a first stage D1, the POS terminal 200 displays in the display screen 301 at least one interactive element such as the virtual keypad 508 referred to above.

In a second stage D2, the computing apparatus 1000 of the POS terminal 200 receives a value of one or more money items which have been denominated at the money item receiving apparatus 900. As described above, these values may be received by automatic monetary value entry software 1104 running in the computing apparatus 1000.

In a third stage D3, the computing apparatus 1000 of the POS terminal 200 responds to the receipt of the value of the one or more money items denominated at the money item receiving apparatus 900 by causing the received monetary value to be automatically entered into the user interface 500 by simulated user input. In particular, as described above, the automatic monetary value entry software 1104 running in the computing apparatus 1000 may cause simulated operator inputs to be created at an interactive element 508 of the user interface 500. This simulates an operator of the terminal 200 typing, or otherwise entering, monetary values into the user interface 500 by use of one or more of the input devices 400 previously described. The third stage D3 may further involve the validation of the entered monetary value, as described above with respect to stage B4 shown in FIG. 5.

In a fourth stage D4, the monetary value input to the user interface 500 by simulated operator input is used to calculate a monetary value to be dispensed from the POS terminal 200. For example, the monetary value input to the user interface 500 by simulated input may be passed from the user interface software 1101 to the accounting software 1102 referred to above and used by the accounting software 1102 to determine a monetary value to be dispensed from the POS terminal 200. The monetary value determined for dispensing is then displayed, by the user interface software 1101, in the third region 503 of the user interface 500.

In a fifth stage D5, the POS terminal 200 determines that a trigger event has occurred. The trigger event signifies that a monetary value is due to be dispensed from the POS terminal 200 to the money item output region 901. As discussed above, the occurrence of the trigger event may be determined from a user input to the terminal 200, or may be automatically determined without user intervention. For example, the trigger event may be the elapse of a predetermined period of time, or a change in the appearance of the display screen 301.

In a sixth stage D6, the POS terminal 200 responds to the occurrence of the trigger event by performing optical character recognition of a region 504-506 of the display screen 301. For example, operating under the control of the automatic dispensing software 1103, the POS terminal 200 may perform optical character recognition on displayed contents of the screen 301 within a virtual recognition window 1200 overlaid on the user interface 500 of the POS terminal 200.

In a seventh stage D7, the POS terminal 200 identifies a monetary value to be dispensed from the characters which were optically recognised in the sixth stage D6. The terminal 200 may, for example, be configured to identify the monetary value to be dispensed as a numerical value indicated by the recognised characters.

In an eighth stage D8, the POS terminal 200 dispenses to the money item outlet region 701 money items to the monetary value identified in the third stage D3. For example, the dispensing apparatus 700 may respond to an instruction from the computing apparatus 1000 to dispense the money items.

It will be appreciated that this combined method could at least also include the stages C1-C5 described above with respect to FIG. 6.

A specific example of how the recognition window 1200 referred to above may be implemented in a Windows® operating system is discussed below. Note that this information is included for the purposes of example only and is not a limiting implementation. Implementations in other operating systems are equally possible.

In the context of a Windows® operating system, the recognition window may be a transparent, frameless window without any additional windows furniture. This is supported in the programming model provided by Windows Presentation Foundation (WPF). In the configuration mode discussed above, the recognition window can be sized, and re-sized, in the display screen 301 using the ResizeWithGrip mode of WPF. The recognition window can be positioned in the display screen 301 by, for example, adding a border to the window and delegating a particular input device action, such as a MouseLeftButtonDown event, to raise an original window reposition event. To maintain transparency, the background of the recognition window may be set as 'white' with a small but non-zero opacity of, for example, 0.01. Once the recognition window has been positioned relative to the display 301, the border referred to above can be set to a width of zero. To ensure that the recognition window remains above the other POS software in the Windows Z-Order, the window's deactivated event may be interrupted and the WPF Window Topmost property may be set to 'true'. This may ensure that the transparent recognition window remains on top of the stack regardless of if it has focus. The capture window 1300 referred to above may be created in a corresponding fashion.

Although the above description is made in the context of a POS terminal 200 of a POS apparatus 100, it will be understood by those skilled in the art that the aspects described above are not limited in their applicability to POS apparatuses. The aspects are more generally applicable to money item processing apparatuses, of various kinds, which include display screens displaying monetary amounts.

Additionally, although the detailed examples of automated dispensing of money items discussed above are made primarily in the context of automatically dispensing a monetary value which fully corresponds to the amount indicated by the optically recognised characters displayed in the third region 503 of the user interface 500, the above described techniques can equally be used to automatically dispense monetary values which are based on, but do not fully correspond with, the amount indicated by the optically recognised characters. An example of this is a partial-payout scenario, where the value of the money items automatically dispensed by the dispensing apparatus 700 is deliberately less than the monetary value indicated by the optically recognised characters.

This may be the case, for example, where the monetary value indicated in the third region 503 of the user interface 500 is to be dispensed using at least two different types of money item, such as at least one coin and at least one bill/note. It may be that the automated dispensing apparatus 700 is responsible for only one or these different money item types, with another related system being responsible for dispensing money items of the other type. In these circumstances, the automatic dispensing software 1103 may determine a proportion of the required total amount to be dispensed that should be made from the dispensing apparatus 700. This determination is made based on the monetary value indicated by the optically recognised characters and, for example, data indicating combinations of money items that are used to dispense particular monetary values. This data may be embedded in the dispensing software 1103.

In the example of FIGS. 2 and 3, for instance, data in the software 1103 may indicate that the full monetary value of $6 indicated by the optically recognised characters is to be dispensed using at least two money item types, such as one $5 bill/note and one $1 coin. If the money item dispensing apparatus 700 is responsible for dispensing only one of these money item types, such as coins, the dispensing software 1103 may determine from the data referred to above the proportion of the total $6 amount that should be dispensed using the dispensing apparatus 700. This could, for example, involve the money item dispensing apparatus 700 dispensing a $1 coin, with the remainder of the total amount, such as a $5 bill/note, being dispensed from another system.

The term 'money item' used herein is intended to include cash money items, such as coins and bills/banknotes, and non-cash money items, such as tokens, printed tickets or similar. Tokens or tickets may be used, for example in a casino, gaming or vending environment as a substitute for cash money items.

The computing apparatus 1000 referred to above may comprise one or more electronic controllers of the POS terminal 200. Such a controller comprises one or more electronic processors, such as one or more microprocessors, and one or more computer readable storage mediums which store computer readable instructions in a computer program. The computer readable storage mediums may comprise, for example, one or more read-only memories (ROMs), random access memories (RAMs), EPROMs, EEPROMs, Flash memories, magnetic or optical cards or application specific integrated circuits (ASICs). Additionally or alternatively, the computer readable storage mediums may comprise any type of storage disk, such as one or more floppy disks, optical disks, CD-ROMs and/or magnetic-optical disks, or any other type of media suitable for storing electronic instructions which can be executed by the one or more processors. The computer readable storage mediums are coupled to the one or more processors and other elements of the controller architecture via a computer system bus. The one or more processors are configured to implement the instructions under the control of the program to operate the POS terminal 200. For example, the controller may be communicatively coupled to a power supply of each of the elements of the terminal 200, including the money items dispensing and receiving apparatuses 700, 900 so that the controller can cause the various functionalities of the POS terminal 200 described above. For the avoidance of doubt, the controller may include a single processor or may comprise one or more architectures employing multiple processor designs for increased computing capability. Although not specifically described above, further computing apparatuses, for example in the form of dedicated microcontrollers, may be present in other elements of the POS terminal 200, including the money item dispensing apparatus 700, money item storage apparatus 800 and money item receiving apparatus 900.

The independent operation of the money item dispensing apparatus 700 and the money item input apparatus 900 described in this specification may allow one or both of these apparatuses 700, 900 to be installed and used in a POS terminal 200 without the need for the apparatus(s) 700, 900 to interface with other equipment in the POS terminal 200. It will be appreciated that there are many different types of POS terminals and that many of these terminals include different POS software solutions. In the absence of the techniques discussed above, configuration of the terminals to support, for example, automatic dispensing of money items via a money item dispensing apparatus or automatic input of received monetary amounts from a money item receiving apparatus, would require modification of the various different existing POS software solutions. In particular, the existing software would need to be modified to natively support the money item dispensing/input protocols of the money item dispensing/receiving apparatuses.

Modification of existing POS software solutions involves a significant amount of technical endeavour, time and cost. It may also involve lengthy disruption to the operation of the terminal, and may under some circumstances produce a detrimental effect on the performance and/or functionality of the existing software. Furthermore, the original developer(s) of an existing POS software solution may no longer be trading, which may result in a lack of availability of the source code that would be necessary for the software to be modified as needed.

The aspects described above remove any requirement for explicit protocol support for the money item dispensing apparatus 700 and/or the money item receiving apparatus 900 within the existing POS software in a POS terminal 200. The aspects described above can be implemented by the skilled person without deep knowledge of the protocols and hardware already present in the POS terminal 200. In an implementation where the money item storage regions 800, the money item dispensing apparatus 700 and/or the money item receiving apparatus 900 is located in a separate secure housing 202 to other elements of the POS terminal 200 (see e.g. FIG. 1A), the automatic dispensing and/or monetary value entry functionality described above may be efficiently added to an existing POS terminal 200. In such a scenario, there may be no need to open the housing 201 containing the existing elements of the terminal 200 in order to add the new functionality. The additional functionality may instead be provided by communicatively coupling the apparatuses contained in the second housing 202 to the computing apparatus 1000 contained in the first housing 201, and installing the automatic dispensing software 1103 and/or monetary value entry software 1104 in the computing apparatus 1000.

On a broad level, the techniques described in the specification make use of a key operating principle of existing POS terminals; POS terminals are optimized for an operator of the terminal to be able to read information from the display screen. The techniques make use of that principle in the manner described above in order to provide for more efficient and less technically disruptive installation of additional peripheral functionality in a POS terminal.

It will be appreciated by those skilled in the art that the aspects discussed above can be used singly or in combination.

Note that Windows® is a registered trademark or trademark of Microsoft Corporation in the United States and/or other countries.

What is claimed is:

1. A method comprising:
determining, using at least one money item denominating apparatus, a monetary value of at least one received money item; and
in response to determining the monetary value, automatically causing at least one simulated user input indicative of the determined monetary value to be provided to at least one interactive user interface displayed in at least one region of a display screen;
wherein the at least one simulated user input comprises an automated actuation of at least one interactive element of the at least one interactive user interface.

2. The method of claim 1, further comprising causing, in response to receipt of the at least one simulated user input indicative of the determined monetary value, the determined monetary value to be displayed in the at least one interactive user interface.

3. The method of claim 1, wherein the at least one simulated user input enters at least one character representative of the determined monetary value into a text display region of the at least one interactive user interface.

4. The method of claim 1, further comprising:
performing optical character recognition on the display screen to determine at least one displayed character indicative of the at least one simulated user input; and
validating that the at least one displayed character indicative of the at least one simulated user input corresponds to the determined monetary value.

5. The method of claim 1, further comprising:
performing optical character recognition on at least one further region of the display screen to determine at least one further displayed character.

6. The method of claim 5, further comprising:
identifying, from the determined at least one further displayed character, a monetary value to be dispensed.

7. The method of claim 6, further comprising:
in response to identifying the monetary value to be dispensed, causing to be dispensed at least one money item corresponding to the identified monetary value.

8. The method of claim 1, further comprising:
performing optical character recognition on at least one still further region of the display screen to determine at least one displayed character;
identifying, from the determined at least one displayed character, a monetary value to be received;
comparing the monetary value of the at least one received money item with the monetary value to be received; and
in response to determining that the monetary value of the at least one received money item is equal to or greater than the monetary value to be received, restricting acceptance of further received money items.

9. The method of claim 8, wherein restricting acceptance of further received money items comprises restricting acceptance of further money items received at the at least one money item denominating apparatus.

10. The method of claim 7, wherein restricting acceptance of further received money items comprises rejecting further money items received at the at least one money item denominating apparatus.

11. An apparatus comprising:
at least one computer processor; and
at least one non-transitory computer readable storage medium containing computer-executable instructions which, when executed by the at least one computer processor, cause the at least one computer processor to perform a method comprising:
   determining, using at least one money item denominating apparatus, a monetary value of at least one received money item; and
   in response to determining the monetary value, automatically causing at least one simulated user input indicative of the determined monetary value to be provided to at least one interactive user interface displayed in at least one region of a display screen;
   wherein the at least one simulated user input comprises an automated actuation of at least one interactive element of the at least one interactive user interface.

12. The apparatus of claim 11, comprising the at least one money item denominating apparatus.

13. A method comprising:
performing optical character recognition on at least one region of a display screen to determine at least one displayed character;
identifying, from the determined at least one displayed character, a monetary value to be received;
determining, using at least one money item denominating apparatus, a monetary value of at least one received money item;
comparing the monetary value of the at least one received money item with the monetary value to be received; and
in response to determining that the monetary value of the at least one received money item is equal to or greater than the monetary value to be received, causing at least one simulated user input to be provided to at least one interactive user interface displayed in the display screen;
wherein the at least one simulated user input comprises an automated actuation of at least one interactive element of the at least one interactive user interface.

14. The method of claim 13, comprising, in response to determining that the monetary value of the at least one received money item is equal to or greater than the monetary value to be received, restricting acceptance of further received money items.

15. The method of claim 14, wherein restricting acceptance of further received money items comprises restricting acceptance of further money items received at the at least one money item denominating apparatus.

16. The method of claim 14, wherein restricting acceptance of further received money items comprises rejecting further money items received at the at least one money item denominating apparatus.

17. The method of claim 16, wherein rejecting the further money items comprises directing the further money items to a money item outlet for collection.

18. The method of claim 13, wherein the at least one simulated user input enters at least one character representative of a monetary value into a text display region of the at least one interactive user interface.

* * * * *